W. Godsoe.
Steering App's.
Nº 24,351. Patented Jun. 7, 1859
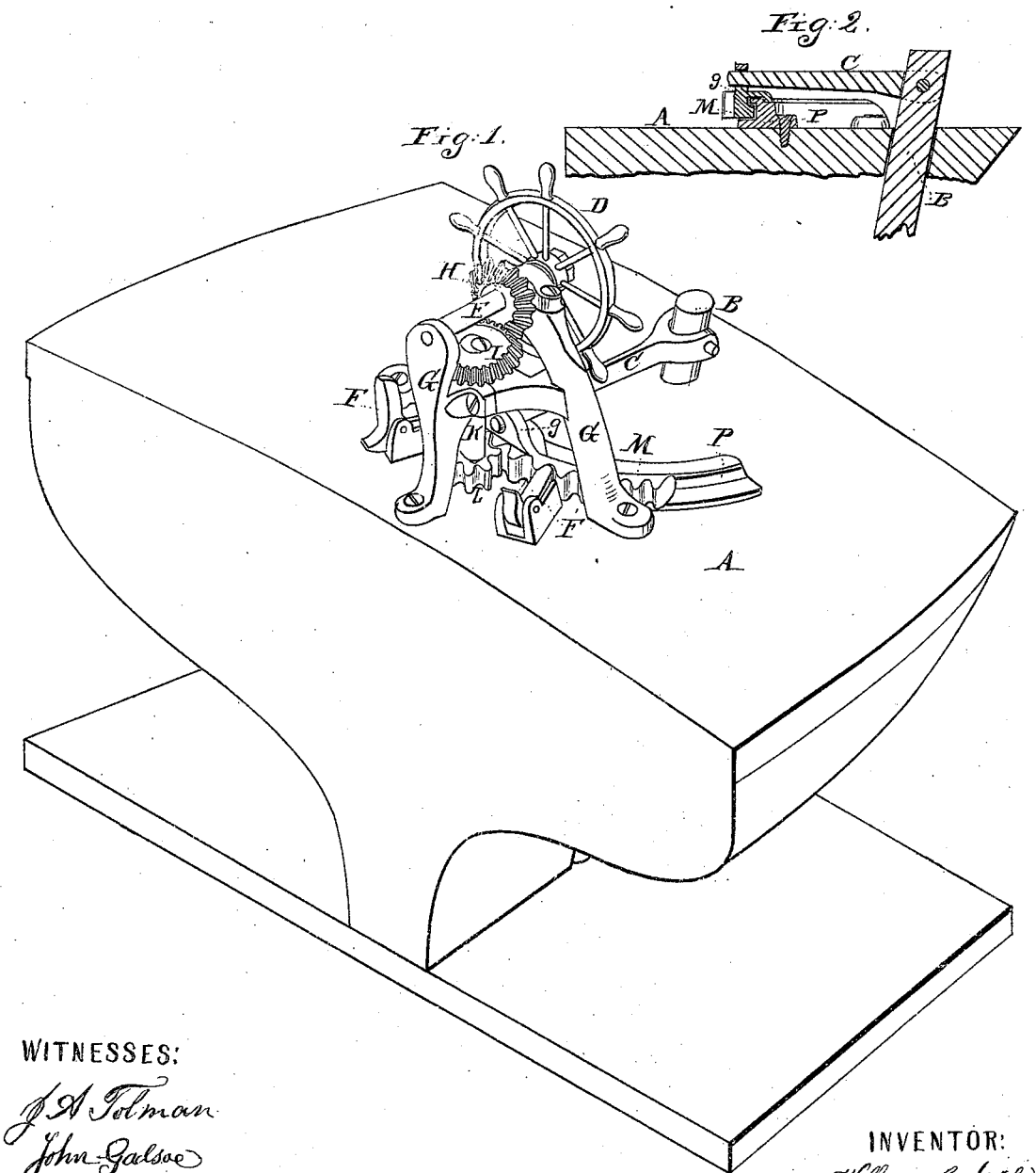
WITNESSES:
J. A. Tolman
John Godsoe
INVENTOR:
William Godsoe

UNITED STATES PATENT OFFICE.

WILLIAM GODSOE, OF MANCHESTER, MASSACHUSETTS, ASSIGNOR TO HIMSELF AND ISAAC AYERS, OF SAME PLACE.

STEERING APPARATUS.

Specification forming part of Letters Patent No. 24,351, dated June 7, 1859; Reissued June 12, 1860, No. 983.

*To all whom it may concern:*

Be it known that I, WM. GODSOE, of Manchester, in the county of Essex and State of Massachusetts, have invented certain Improvements in Mechanical Steerers for Vessels, of which the following is a full, clear, and exact description, reference being had to the accompanying drawings, in which—

Figure 1 is a perspective view of my improved steerer; Fig. 2 detail to be referred to hereafter.

It often occurs that the helmsman desires to secure his helm in a particular position either that he may leave it momentarily or for a longer time as in laying to. This is often accomplished by lashing the helm, and my present improvement has for its object to enable the helmsman at any moment to secure his helm in position and again instantly to release it when required.

In the said drawings A is the deck of the vessel, B the rudder post, C the tiller and D the steering wheel. The shaft E of the latter runs in a frame G secured to the deck and carries a bevel gear H, which engages with a similar wheel I, upon a vertical shaft K. This shaft carries at its lower extremity a toothed wheel L, that engages with a toothed segment or rack M that slides freely upon the curved way P, the center of which is the center of motion of the rudder post.

From the middle of the length of the segment M, rises an ear $g$ through which passes the end of the tiller, and thus as the steering wheel is turned the rudder is operated as will be apparent from the connection of the parts already explained.

F F' are hinged pawls or dogs secured to the deck, either one of which may be caused to engage with the curved rack M, and when either of them is thus engaged with the rack the rudder will be held immovably. In Fig. 1, F' is seen engaged with the rack and F is disengaged therefrom.

What I claim as my invention and desire to secure by Letters Patent is—

The combination of the toothed segment M and the curved way P, operating as set forth for the purpose specified.

WILLIAM GODSOE.

Witnesses:
  J. A. TOLMAN,
  JOHN GODSOE.